United States Patent
Ciantar et al.

(10) Patent No.: US 7,575,771 B2
(45) Date of Patent: Aug. 18, 2009

(54) METHOD OF UTILIZING OFFALS FOR PET FOOD MANUFACTURE

(75) Inventors: Rachel Ciantar, Wodonga (AU); David P. Alexander, Wodonga (AU); Ian W. Thomas, Albury (AU)

(73) Assignee: Mars Incorporated, McLean, VA (US)

( * ) Notice: Subject to any disclaimer, the term of this patent is extended or adjusted under 35 U.S.C. 154(b) by 868 days.

(21) Appl. No.: 10/485,697

(22) PCT Filed: Aug. 1, 2002

(86) PCT No.: PCT/AU02/01030

§ 371 (c)(1),
(2), (4) Date: Jul. 21, 2004

(87) PCT Pub. No.: WO03/013267

PCT Pub. Date: Feb. 20, 2003

(65) Prior Publication Data

US 2004/0265470 A1 Dec. 30, 2004

(30) Foreign Application Priority Data

Aug. 3, 2001 (AU) .................................. PR6801
Jan. 7, 2002 (AU) .................................. PR9860

(51) Int. Cl.
*A23L 1/31* (2006.01)
(52) U.S. Cl. .................. 426/480; 426/641; 426/516; 426/518; 426/805; 426/657
(58) Field of Classification Search ............... 426/641, 426/516, 518, 805, 657, 480
See application file for complete search history.

(56) References Cited

U.S. PATENT DOCUMENTS 5,200,085 A * 4/1993 Rudolf et al. ............... 210/703
5,620,737 A * 4/1997 Kazemzadeh ............... 426/641
6,312,746 B2 * 11/2001 Paluch ......................... 426/282

\* cited by examiner

*Primary Examiner*—Anthony Weier
(74) *Attorney, Agent, or Firm*—Fulbright & Jaworski LLP

(57) ABSTRACT

The invention involves a method for the recover of commercial slaughter waste streams for use in the manufacture of commercial pet food products, wherein waste materials are collected following the commercial slaughter of animals, the greater part of those materials being size reduced as necessary and heated, whereupon a proteinaceous fraction, lipidaceous fraction, and aqueous fraction are formed and substantially separated from one another and wherein each of said fractions are subsequently used in the production of commercial pet foods or components thereof.

13 Claims, 5 Drawing Sheets

Current Process

| | | |
|---|---|---|
| Hearts | → | Product background |
| Kidneys | → | Product background |
| Tripe (limited usage) | → | Product background |
| Lungs | → | chunk |
| Liver | → | palatant in most products |
| | | Higher Moisture Extruded Chunk (HMEC) |
| | | Steam Set Meat (SSM) |
| Offcuts | → | SSM (limited use) |
| | | Background (limited use) |
| Chicken offals | → | Product background |
| Chicken heads & feet | → | Product background |
| Chicken pieces | → | Product background |
| | | SSM |
| Neck skins | → | Product background |

FIGURE 2

METHOD OF UTILIZING OFFALS FOR PET FOOD MANUFACTURE

CROSS-REFERENCE TO RELATED APPLICATIONS

This application is a national stage filing of PCT/AU02/01030 filed Aug. 1, 2002 claiming priority to Australian applications PR6801 filed Aug. 3, 2001 and PR9860 filed Jan. 7, 2002.

TECHNICAL FIELD

The present invention is directed to a method for the recovery of commercial slaughter waste streams for use in the manufacture of commercial pet food products.

BACKGROUND OF THE INVENTION

Petcare companies have for many years provided commercial petfoods to various markets around the world. Commercial petfood products are designed to be nutritious, but are also required to be highly palatable to ensure the animal consumes sufficient volume to receive its nutritional requirements, and to ensure the pet owner is satisfied that the product is 'satisfying' the animal's needs.

One of the aesthetic drawbacks of traditional commercial petfoods is that they have been perceived by pet owners as 'artificial', and by inference, not as healthy or satisfying for the animal. This perception may exist quite independently of the actual nutritional or sensory performance of the products.

Therefore, to enhance the owner's perception of these products, there has always been a need to provide a 'meat-like' texture in commercial petfoods, in order to provide 'real food' cues to the owner of the pet and to provide satisfying texture to the animal.

To provide the 'muscle meat' texture that is desirable, but on a cost-effective basis, commercial petfood manufacturers have developed various technologies to make manufactured meat analogues, or meat-like chunks. This is often done by utilizing the binding functionality of selected raw material to form an integral mass from comminuted meat and/or cereal slurries via various processes. The recent evolution of this technology is summarized as follows:

1970's

Lower-moisture extruded vegetable protein has been used as a 'chunk' in packaged foods. It has a 'meaty' internal texture, but does not have good palatability, particularly for felines. Also, the requirement for high levels of sulfur in the recipe is a drawback in relation to its undesirable impact on the product and packaging aesthetics.

Meat slurries were created from low-grade meat offals, cooked in gas ovens and cut into chunks. However, these chunks tended to be not as palatable as muscle meat and did not display a satisfactorily 'meaty' internal texture.

Lung lobes have been cut to resemble muscle meat. However the sorting and trimming required to obtain the lobes themselves, as well as the poor recovery of lung chunks through high-volume size reduction processes, and the further poor recovery of chunk size post canning, are significant drawbacks for this technique.

1980's

Meat analogue chunks manufactured from meat slurries were made resilient via the use of materials with binding properties such as cereal starch/konjac/alginate/pectin. However, many of these chunks lacked realistic texture, especially internally. Some of the binders also tended to be relatively expensive.

1990's

'Steam-Set Meat' (SSM) chunks formed from slurries cooked in steam ovens and cut into chunks, particularly utilizing the water binding ability of such materials as egg white, blood plasma, soy protein isolate, selected chicken pieces, cereal binders and gelling agents to provide resilience. The chunks themselves were not superior to the gas-oven chunks, however this technique was preferred to gas-oven cooking due to the elimination of fires and due to lower maintenance costs.

SSM chunks are also prone to degradation during mixing and filling operations, and lack a realistic 'meaty' internal texture. They also require a complex multi-stage manufacturing process, and depend on the binding ability of high cost ingredients such as blood plasma and wheat gluten and muscle meats for resilience.

2000's

Utilisation of higher-moisture extrusion techniques to create a Higher Moisture Extruded Chunk (HMEC) that is highly digestible and palatable, yet resilient during mixing and filling operations. One such operation is described in PCT Patent Application No. PCT/AU00/00475, in the name of Effem Foods Pty Ltd. The resultant product is capable of replicating the textured appearance of beef, lamb, chicken and fish. It will be understood by those skilled in the art that reference to 'higher-moisture extrusion' encompasses extrusion cooking of materials having an overall moisture content of greater than about 30% by mass.

However, one of the requirements of successful higher-moisture extrusion is that the proteinaceous feed stream is low in fat and ideally also low in water. The type of higher-moisture and/or high fat slurries traditionally used for meat-based chunks tends to be too low in viscosity for extrusion. Technically, this may be overcome by the addition of high-grade protein sources such as wheat gluten, soy protein and spray-dried egg white, as well as other high-cost, low-fat meat streams such as liver. However, these materials are too high in cost to be contemplated for the vast majority of commercial petfood products.

For a commercial pet food manufacturer to improve the utilization of the above described HMEC and SSM technologies in packaged pet foods, it is accordingly desirable to ameliorate some or all of the disadvantages of these technologies.

In parallel, the development of lower-moisture extruded commercial pet foods has driven a demand for:

tallow as a palatability and fat source to provide sufficient dietary energy in an otherwise mainly cereal-based product; and Palatable, aqueous coatings that may be sprayed on to the extruded kibbles to improve their palatability.

It will be understood by those skilled in the art that reference to 'lower-moisture extrusion' encompasses extrusion cooking of materials having an overall moisture content of less than about 30% by mass. Similarly, 'lower moisture foods' are equivalent to food materials having a moisture content of less than about 30% by mass.

It will further be understood by those skilled in the art that reference to 'higher-moisture extrusion' encompasses extrusion cooking of materials having an overall moisture content of greater than about 30% by mass. Similarly, 'higher moisture foods' are equivalent to food materials having a moisture content of greater than about 30% by mass.

Tallow is typically obtained from commercial rendering plants, where mammal by-products not directed to the human or pet foods streams are processed. Recently, however, concerns have grown regarding the introduction of 'specific risk materials' (SRM's) into the mammalian food stream. These materials include spleen, brain, and spinal cord, and are associated with degenerative diseases such as Bovine Spongiform Encephalopathy (BSE). As these materials are often processed by renderers, there is a significant risk that these materials may be incorporated into commercial lower-moisture petfoods, with a potential long-term health risk for the animal. Therefore, it would be advantageous to develop an alternative, low-cost fat source that is free of BSE risk.

In parallel with the above issues, there is a desire to improve the profitability of commercial pet food operations by reducing the expense and complexity of the red meat, chicken and fish supply chain. A typical flow chart for the red meat supply stream to a commercial pet food manufacturer is shown in FIG. 1.

Typically, bovine, ovine and porcine materials are directed to one of three main streams at the abattoir: 'human consumption', 'petfood only' and 'condemned'. The mixed organs of the petfood stream are directed to large bins.

At the collector, usually a separate plant to the abattoir and the petfood manufacturer, the petfood offal bins are sorted into their components such as lung, liver, hearts, kidneys and others with the remaining material stream called offcuts. Offcuts may include: muscle meat trims, tongue roots, trachea, gullets, weasands, liver, lung off-cuts, hearts, kidney, pig testes, pig skin and blooded lung lobe trims, among other things. Considerable expenses are incurred in refrigerated storage and transport of the mixed offal from abattoir to collector, manual sorting and trimming of various organs at the collector, and subsequent frozen storage and transport to the petfood manufacturer. Therefore, there would be considerable advantage in removing or reducing the petfood manufacturer's reliance on the collector. However, there are some obstacles to be overcome in doing this.

In the past, there were no chunk manufacturing technologies that could successfully utilize unsorted, or only partially sorted, red meat organs. Sorting allows the particular properties of particular organs to be specifically utilized in the pet foods products, both in chunks and in the 'background' of the petfoods, while allowing the diversion of troublesome ingredients such as offcuts away from the critical manufacturing processes and products. The typical distribution of these sorted materials in a commercial packaged petfood manufacturing process is illustrated in FIG. 2. It will be understood by those skilled in the art that reference to 'packaged' petfoods is also intended to encompass all packaging formats in which commercially sterilised, higher-moisture petfoods are packaged. These other packaging formats may include sealed aluminium trays and sealed pouches made from flexible films. The typical distribution of these sorted materials in a commercial lower-moisture packaged petfood manufacturing process is illustrated in FIG. 3.

The offcuts stream is extremely variable, particularly in fat level (typical range is 10%-40% but may vary outside these limits). This variability limits its use in chunk manufacture and canning processes due to the interference of the fat on the protein setting process, which in turn has an adverse effect on the product aesthetics. The "cookout" which occurs from this material during canning also tends to degrade the appearance of the product.

As described above for red meats, chicken and other poultry-based materials undergo multiple process, storage and transport stages in between slaughter and the petfood manufacturer. This significantly adds to the effective cost of these materials to the petfood manufacturer. The typical chicken material collection process is shown in FIG. 4.

These materials are received as either 'Chicken Offals'—a stream of heads, feet, bones and viscera in varying ratios, and hence variable fat and moisture content, or as 'Chicken Pieces'—chicken frames and other whole chicken components which, while they may vary in composition, are valuable due to the functionality of the protein contained therein. This functionality could potentially be used to reduce reliance on expensive functional protein isolates, such as egg white powder, blood plasma and soy protein isolate. However, inherent variations in fat and moisture tend to interfere with the functionality of the protein.

Therefore, it is desired to provide a method of more efficiently collecting and processing red meat and poultry offal, in order to facilitate the improved quality and cost-effectiveness of commercial petfood manufacture.

BRIEF SUMMARY OF THE INVENTION

In a first aspect, the invention provides a method for the recovery of commercial slaughter waste streams for use in the manufacture of commercial pet food products, wherein; waste materials are collected following the commercial slaughter of animals selected from the group consisting of bovine mammals, ovine mammals, porcine mammals, poultry and fish; the greater part of those materials are size-reduced as necessary; then heated; whereupon the proteinaceous fraction, lipidaceous fraction and aqueous fraction are substantially separated from one another; and wherein each of the proteinaceous fraction, lipidaceous fraction and aqueous fraction are subsequently used in the production of commercial pet foods or components thereof.

The homogenization of all of the waste materials, followed by separation of the materials into specific functional fractions, based on composition, provides the petfood manufacturer with greater control over the performance of these slaughter by-product materials during subsequent processing into petfood items. The issue of the variable water/fat/protein content of the individual sorted organs and off-cuts may be reduced or eliminated. This also reduces or eliminates the need for costly manual sorting of the abattoir by-products into individual organs. For example, the inefficient process of creating lung lobe chunks may be replaced by feeding some of the materials produced by the invention into a better-controlled analogue chunk process, such as the HMEC process.

Advantageously, the materials may be acidified prior to the separation stage. This may improve the separation of water and fat from the proteinaceous material. Acidification may also improve the floor-life of the fractions and may have a positive effect on the palatability of the final food products. Preferably, the material is acidified to a pH of between 1.5 and 5.0, with a preferred target pH range of 2.5 to 4.0.

The materials may be initially separated into a proteinaceous fraction, and a combined lipidaceous and aqueous fraction, existing as a stable emulsion. Advantageously, this combined lipidaceous and aqueous fraction may be used as an energy source and/or as a palatability-enhancer in the manufacture of lower-moisture extruded pet foods or components thereof, or as a palatability-enhancing ingredient in canned pet foods.

Advantageously, the lipidaceous fraction may be used as an energy source and/or as a palatability-enhancer in the manufacture of lower-moisture extruded pet foods or components thereof.

Advantageously, the aqueous fraction may be used as a coating in the manufacture of lower-moisture extruded pet foods or components thereof. It may be used 'as is', or concentrated prior to coating on the pet foods.

Advantageously, the proteinaceous fraction may be used in the manufacture of texturized, lower-moisture extruded pet foods or components thereof.

Advantageously, the proteinaceous fraction may be incorporated as a protein source in the manufacture of higher-moisture, extruded meat analogue chunks for incorporation into commercial packaged pet foods or components thereof.

Advantageously, the proteinaceous fraction may be incorporated as a protein source in the manufacture of lower-moisture, extruded meat analogue chunks for incorporation into commercial packaged pet foods or components thereof.

Advantageously, the proteinaceous fraction may be incorporated as a functional binding protein source in the manufacture of higher-moisture meat analogue chunks for incorporation into commercial packaged pet foods or components thereof.

Advantageously, the proteinaceous fraction may be dried to a moisture content of approximately <15%. This may improve its floor life as it awaits further processing.

Advantageously, the proteinaceous fraction may be incorporated as a palatant in the background meat matrix of higher-moisture commercial packaged pet foods.

Preferably, and especially for mammal-sourced materials, the size-reduction is carried out as coarse grinding followed by fine grinding. The coarse grinding may be carried out via a continuous meat grinder, such as those manufactured by e.g. Weiler & Co., or Wolfking & Co. Preferably, the feed screw may be selected from standard types suitable for frozen or fresh materials, depending on what feed is used. Preferably, the holeplate hole sizes are between 3 mm and 10 mm.

The fine grinding, or emulsification, is performed by a standard meat slurry emulsification unit, for example those machines manufactured by Karl Schnell or Wolfking & Co. Preferably, the holeplate hole sizes are between 1.7 mm and 6.0 mm. Preferably, output temperature from the fine grinding unit operation should not exceed 25-35° C.

Where the proteinaceous fraction is to be used in the manufacture of meat analogue chunks, or jerky-style snacks, the emulsified material is preferably heated to within the range 35-60° C., and advantageously to within the range 40-50° C., in order to preserve protein functionality. Where the proteinaceous fraction is to be used in the manufacture of higher-moisture, or lower-moisture, extruded meat analogue chunks, the emulsified material is preferably heated to within the range 40-140° C., and advantageously to within the range 45-100° C. The material may be heated either continuously or in a batch process. The material may be heated by direct steam injection into a mixing vessel, or by heat transfer via an indirect heating method, such as a heat exchanger.

Preferably, a separation process utilizing centrifugal force may be used to separate the proteinaceous, lipidaceous and aqueous phases. A preferred type is a decanter centrifuge such as those supplied by Alfa Laval, or Westfalia Separator. Separation of the three phases may be performed as a single or two-stage unit operation. If a single unit operation is chosen a decanter centrifuge designed to separate a single feed stream into three product streams is preferred. If a two-stage operation is chosen, it is preferred to first separate the proteinaceous stream form the aqueous/lipidaceous stream, subsequently separating the aqueous and lipidaceous streams. The feed rate to the separator may be between 500-20,000 kg/h depending on size of decanter chosen and output required.

The aqueous fraction should preferably be concentrated to a solids level of 5-30%, or by a factor of between 1× to 7×, according to its application. A number of suitable unit operations may be used. Two preferred methods include centrifugation and evaporation.

A flow chart of a process embodying the invention is given in FIG. 5.

In another aspect, the invention provides a viscous, high-protein substrate for the manufacture of packaged commercial pet foods, or components thereof, wherein waste materials are collected from the commercial slaughter of one or more animals selected from the group consisting of bovine mammals, ovine mammals, porcine mammals poultry and fish, the greater part of those materials are size-reduced as necessary; then heated, whereupon the proteinaceous fraction, lipidaceous fraction and aqueous fraction are substantially separated from one another in a separation unit operation; and wherein the proteinaceous fraction is subsequently used as a component in the production of packaged commercial pet foods, or components thereof.

The proteinaceous fraction advantageously provides a suitable high viscosity, reduced-fat protein source for the efficient and cost-effective higher-moisture extrusion of fibrous-textured meat analogue chunks. Preferably this fraction may be diverted to a meat analogue process, for example the hereinbefore-described HMEC process. This material will tend to be sufficiently palatable and will have sufficient viscosity to promote effective higher-moisture extrusion. This material may also be used as a major component in the manufacture of meat-based snack foods, e.g. jerky-style snack products for pet mammals. The material will advantageously be highly palatable and lead to the production of highly palatable meat analogues, assisting in reducing reliance on individual livers as palatability enhancers, as sorted by collectors.

The waste materials may be made up of any combination of red meat, poultry or fish. For example, if fish materials (e.g. whole whiting) are used, the invention provides the opportunity to produce a textured, fish analogue chunk that contains a high percentage of fish material, by feeding the proteinaceous fraction through e.g. the HMEC process. The proteinaceous fraction according to the invention may advantageously included in the HMEC process feed at up to 95% by weight.

Some commercial packaged petfood products feature lower-moisture extruded chunks as internal components. The proteinaceous fraction may advantageously be used as a palatable protein source to wholly or partially replace non-meat protein sources, such as wheat gluten, in these products. The proteinaceous fraction according to the invention may advantageously included in such chunks at up to 50% by weight.

Preferably the proteinaceous fraction possesses the following approximate composition:

Protein: 15-40%
Moisture: 50-75%
Fat: 1-15%

Advantageously, said proteinaceous fraction possesses the following approximate composition:

Protein: 25-35%
Moisture: 60-70%
Fat: 1-8%

Or if dried:

Protein: 60-80%
Moisture: 5-15%
Fat: 5-20%

In another aspect, the invention provides an energy source for lower-moisture extruded commercial petfoods, or components thereof, wherein waste materials are collected from the commercial slaughter of one or more animals selected from the group consisting of bovine mammals, ovine mammals, porcine mammals poultry and fish, the greater part of those materials are size-reduced as necessary; then heated, whereupon the proteinaceous fraction, lipidaceous fraction and aqueous fraction are substantially separated from one another in a separation unit operation, and wherein said lipidaceous fraction is incorporated in extruded lower-moisture kibbles used as components in the production of commercial pet foods.

Advantageously, said lipidaceous fraction provides a palatable energy source for incorporation into commercial petfoods, which is not sourced from a renderer. This would assist in ensuring that the commercial petfood does not carry a risk of promulgating degenerative diseases, such as BSE, that are associated with by-products of commercial rendering operations. Said lipidaceous fraction could advantageously be supplied to the petfood manufacturing process at a lower cost than a commercially rendered tallow, on at least a 'unit cost per unit energy' basis.

Preferably the lipidaceous fraction possesses the following approximate composition:
Protein: 0-5%
Moisture: 0-5%
Fat: 90-100%

Advantageously, said lipidaceous fraction possesses the following approximate composition:
Protein: 0-1%
Moisture: 0-1%
Fat: 98-100%

In another aspect, the invention provides a coating for lower-moisture extruded commercial pet foods, or components thereof, wherein waste materials are collected from the commercial slaughter of one or more animals selected from the group consisting of bovine mammals, ovine mammals, porcine mammals poultry and fish, the greater part of those materials are size-reduced as necessary; then heated, whereupon the proteinaceous fraction, lipidaceous fraction and aqueous fraction are substantially separated from one another in a separation unit operation, whereupon the aqueous fraction is concentrated; and wherein said concentrate is then sprayed on to the surface of lower-moisture kibbles used as components in the production of lower-moisture extruded dry commercial pet foods.

Advantageously, said concentrated aqueous fraction provides a palatability enhancement for incorporation into commercial petfoods, which is not sourced from a renderer. This would assist in ensuring that the commercial petfood does not carry a risk of promulgating degenerative diseases, such as BSE, that are associated with by-products of commercial rendering operations.

Preferably, the aqueous fraction possesses the following approximate composition:
Protein: 0-5%
Moisture: 90-100%
Fat: 0-5%

Advantageously, said aqueous fraction possesses the following approximate composition:
Protein: 0-3%
Moisture: 94-100%
Fat: 0-3%

In another aspect, the invention provides a source of functional proteins for assisting in developing resilience in meat analogue products for use in commercial packaged pet foods, or components thereof, wherein waste materials are collected from the commercial slaughter of one or more animals selected from the group consisting of bovine mammals, ovine mammals, porcine mammals poultry and fish, the greater part of those materials are size-reduced as necessary; then heated, whereupon the proteinaceous fraction, lipidaceous fraction and aqueous fraction are substantially separated from one another in a separation unit operation, wherein said proteinaceous fraction is incorporated in meat analogue products for use in commercial packaged pet foods, or components thereof.

The ground material is preferably heated to a temperature within the range 40-50° C. in order to preserve protein functionality. This material may advantageously be used to partially or wholly replace more costly protein isolates, such as spray-dried blood plasma and wheat gluten in the manufacture of meat analogue chunks. For this application, the waste materials are preferably sourced from poultry.

The invention will now be further explained by way of a specific non-limiting example of a method of utilizing commercial abattoir waste streams for commercial pet food manufacture, according to the invention.

BRIEF DESCRIPTION OF THE DRAWING

FIG. 2 is a flow chart of a typical packaged pet food manufacture;

DETAILED DESCRIPTION OF THE INVENTION

Figure 1:
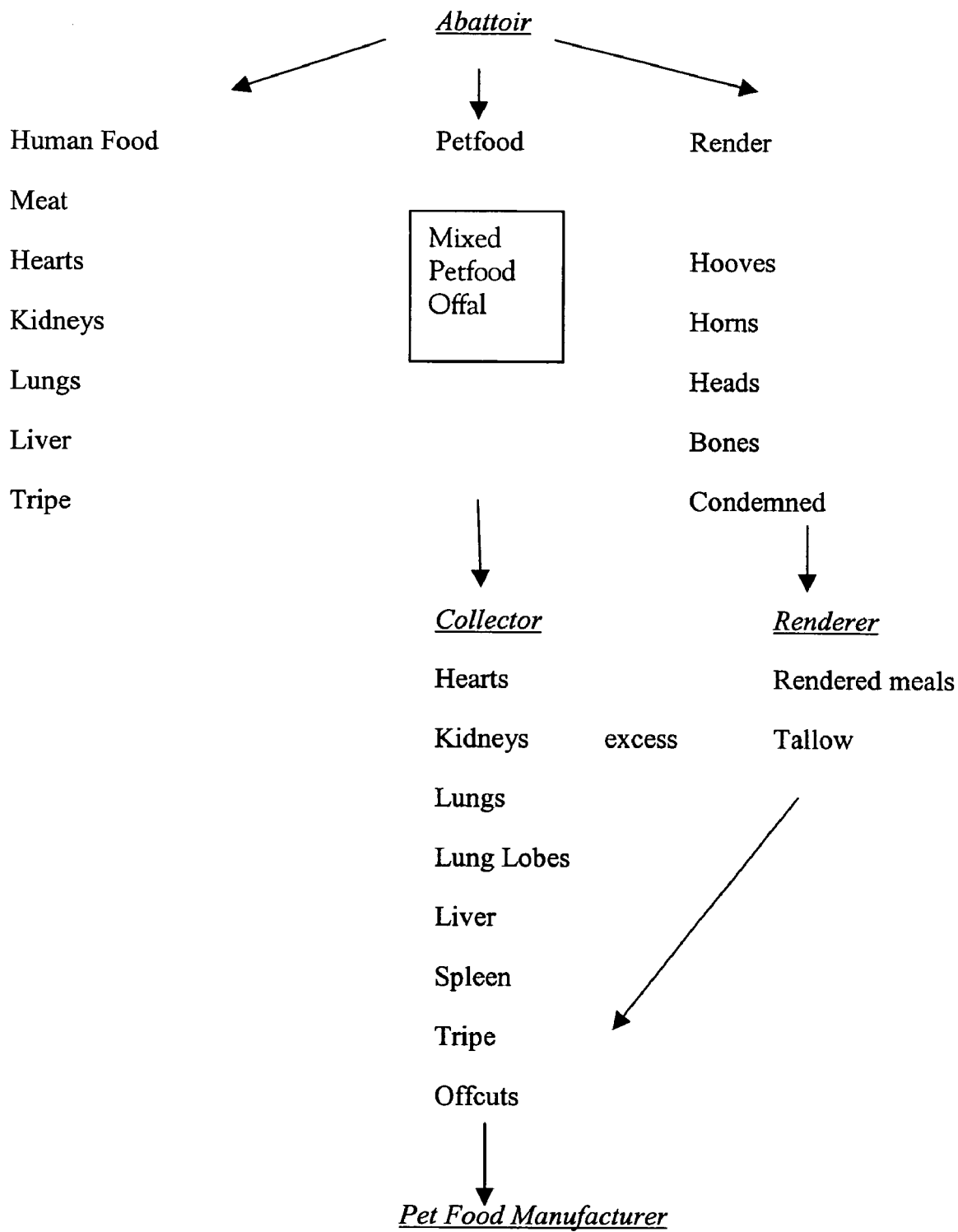
FIG. 1 is a flow chart of a typical red meat collection process.
Figure 3:
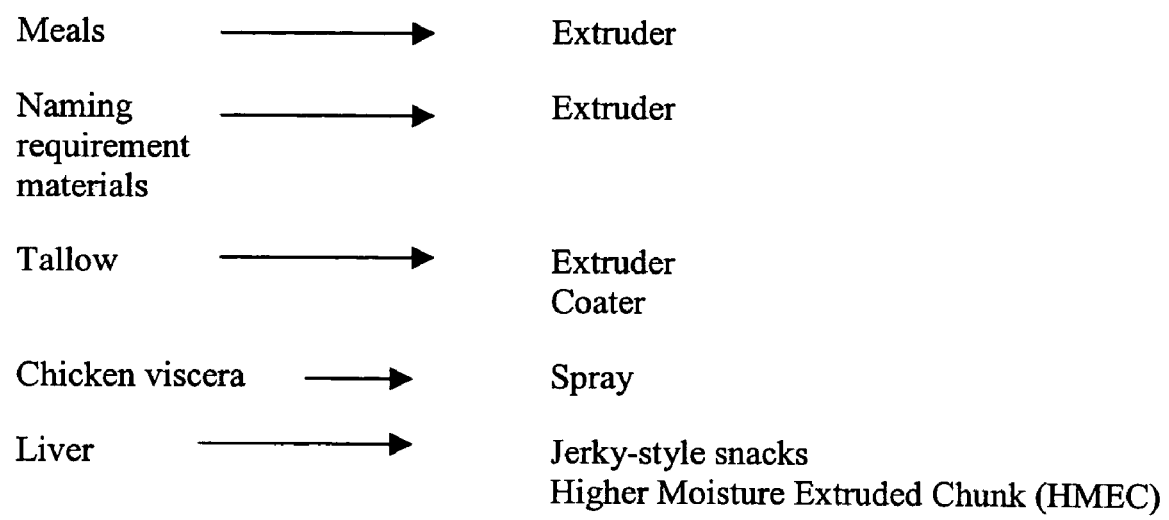
FIG. 3 is a flow chart of a typical lower-moisture pet food manufacturing process.
Figure 4:
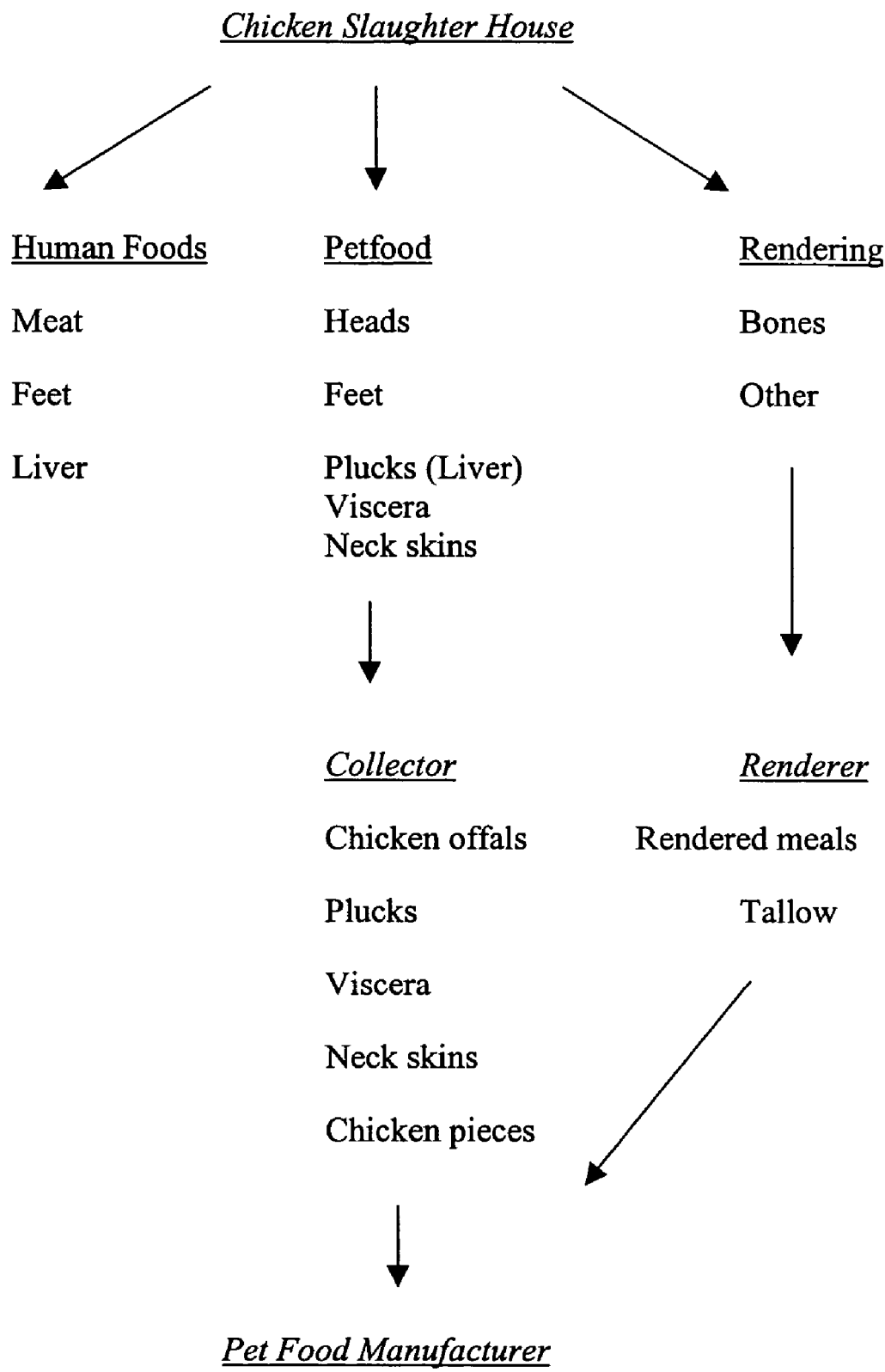
FIG. 4 is a flow chart of a typical chicken collection process.

At the commercial abattoir, unsorted pet food grade offals, as per those discussed above in the prior art, are collected in bins according to normal practices. These bins are shipped to the site of the commercial pet food manufacturer. The offals may be chilled to below 10° C., depending on the length of the transport chain.

Once received, the offals are ground through a continuous meat grinder, such as those manufactured by e.g. Weiler & Co., or Wolfking & Co., having a feed screw of a standard type suitable for frozen or fresh materials, and a holeplate hole size are between 3 mm and 10 mm.

The offals are then ground through a fine grinder, such as a meat slurry emulsification unit, for example those machines manufactured by Karl Schnell or Wolfking & Co. The holeplate hole sizes recommended for this operation are between 1.7 mm and 6.0 mm. The target output temperature of the material exiting this fine grinding unit operation should not exceed 25-35° C.

At this point, the materials may be acidified, in order to improve the subsequent separation of water and fat from the proteinaceous material. Acidification may also improve the floor-life of the fractions and may have a positive effect on the palatability of the final food products. This can be done via the addition of a simple food-grade acid such as Hydrochloric Acid, diluted sufficiently to avoid denaturation of proteins on contact. This may be done while the slurry is agitated in a stirred and/or recirculated vessel, or may be done via 'in-line' injection of acid into the stream exiting the fine grinding operation. The target pH range is between 2.5 to 4.0.

Where the proteinaceous fraction is to be used in the manufacture of meat analogue chunks, or jerky-style snacks, the emulsified material is heated to within the range 35-60° C., and advantageously to within the range 40-50° C., in order to preserve protein functionality. Where the proteinaceous fraction is to be used in the manufacture of higher-moisture, or lower-moisture, extruded meat analogue chunks, the emulsified material may be heated to within the range 40-140° C., and advantageously to within the range 45-100° C. The material may be heated either continuously or in a batch process. The material may be heated by direct steam injection into a mixing vessel, or by heat transfer via an indirect heating method, such as a heat exchanger.

The proteinaceous, lipidaceous and aqueous phases are separated by passing the slurry through a decanter centrifuge such as those supplied by Alfa Laval, or Westfalia Separator. Separation of the three phases may be performed as a single or two-stage unit operation. If a single unit operation is chosen a decanter centrifuge designed to separate a single feed stream into three product streams is preferred. If a two-stage operation is chosen, it is preferred to first separate the proteinaceous stream form the aqueous/lipidaceous stream, subsequently separating the aqueous and lipidaceous streams. The feed rate to the separator may be between 500-20,000 kg/h depending on size of decanter chosen and output required.

The aqueous fraction should preferably be concentrated to a solids level of 5-30%, or by a factor of between 0× to 7×, according to its application. A number of suitable unit operations may be used. Two preferred methods include centrifugation and evaporation.

Figure 5:
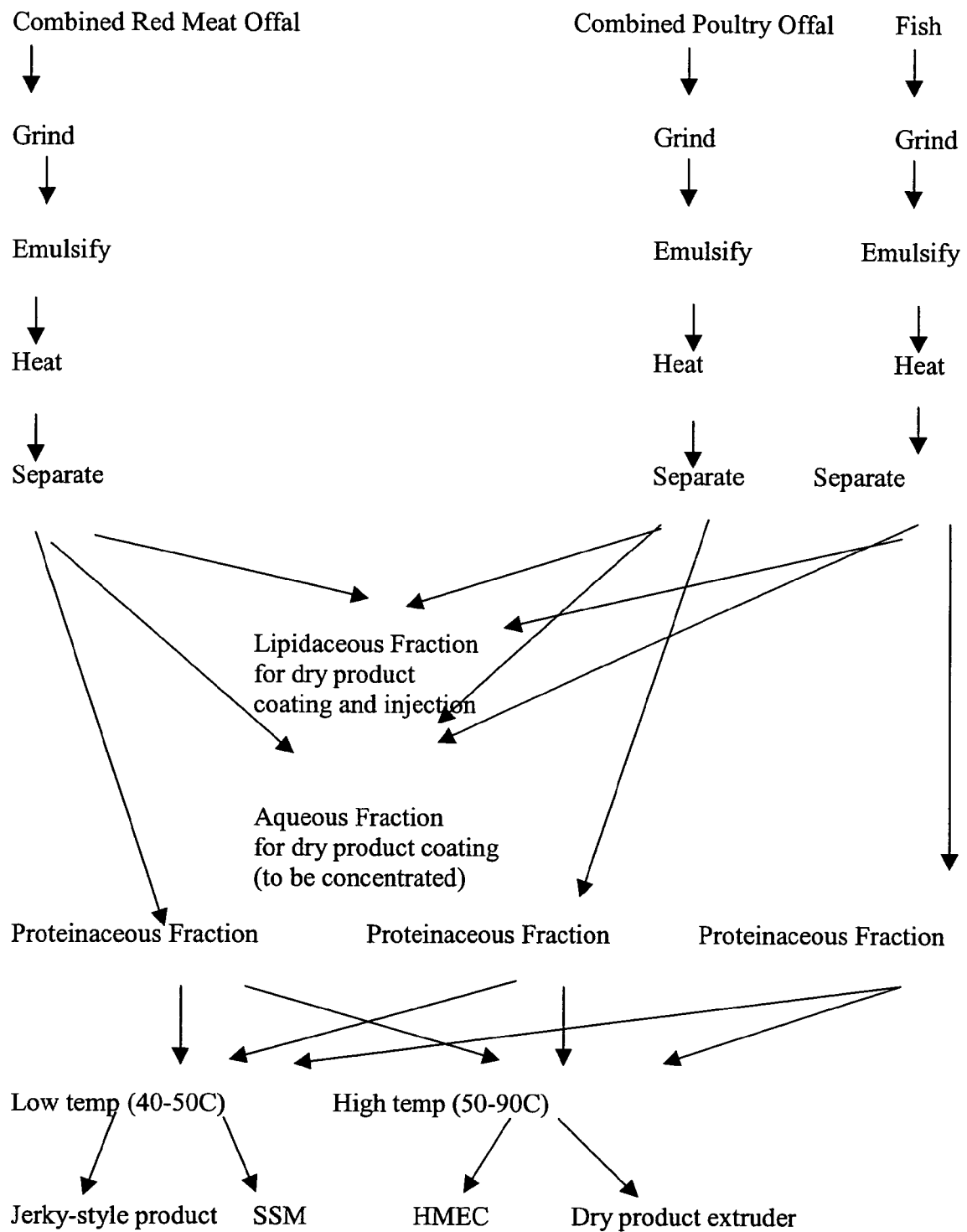
FIG. 5 is a flow chart of an embodiment of the process according to the invention.

A flow chart of a process embodying the invention is given in FIG. 5.

The proteinaceous fraction exiting the centrifuge should have the following approximate composition: Protein: 25-35%; Moisture: 60-70%; Fat: 1-8%.

If desired, the proteinaceous fraction may be dried to a composition of: 60-80%; Moisture: 5-15%; Fat: 5-20%.

The lipidaceous fraction exiting the centrifuge should have the ng approximate composition: Protein: 0-1%; Moisture: 0-1%; Fat: 98-100%.

The aqueous fraction exiting the centrifuge should have the following mate composition: Protein: 0-3%; Moisture: 94-100%; Fat: 0-3%.

The invention claimed is:

1. A method for the recovery of commercial waste parts for use in the manufacture of commercial pet food products, comprising the steps of:
    collecting waste parts selected from the group consisting of hearts, kidneys, lungs, liver, spleen, tripe, meat offcuts, chicken viscera, chicken heads and feet, chicken pieces, and chicken necks from the commercial processing of animals;
    size-reducing the waste parts by grinding to produce an emulsified material;
    heating said the emulsified material;
    substantially separating the proteinaceous fraction from the lipidaceous and aqueous fractions;
    substantially separating the lipidaceous and aqueous fractions from one another;
    wherein the proteinaceous, lipidaceous and aqueous fractions are each subsequently used in the production of commercial pet foods or components thereof.

2. The method of claim 1, wherein the emulsified material is acidified to a pH of between 1.5 and 5.0 prior to the separation stage.

3. The method of claim 1, wherein the proteinaceous fraction is used in the manufacture of texturised extruded pet foods or components thereof.

4. The method of claim 1, wherein the proteinaceous fraction is incorporated in the manufacture of extruded meat analogue chunks for incorporation into commercial packaged pet foods or components thereof.

5. The method of claim 1, wherein the proteinaceous fraction is incorporated as a functional binding protein source in the manufacture of meat analogue chunks incorporated into commercial packaged pet foods or components thereof.

6. The method of claim 1, wherein the proteinaceous fraction is incorporated as a palatant in the background meat matrix of commercial packaged pet foods.

7. The method of claim 1, wherein the proteinaceous fraction is dried to a moisture content of <15%.

8. The method of claim 1, wherein output temperature from the size-reduction operation does not exceed 35° C.

9. The method of claim 1, wherein the size-reduced material is heated to within the range of 35-60° C.

10. The method of claim 1, wherein a separation process utilizing centrifugal force is used to separate the proteinaceous, lipidaceous and aqueous phases.

11. The method of claim 2, wherein the waste materials are acidified to a pH of between 2.5 to 4.0, prior to the separation stage.

12. The method of claim 9, wherein the fine-ground material is heated to within the range of 40-50° C.

13. The method of claim 1, wherein the waste parts are selected from the group consisting of bovine mammals, bovine mammals, porcine mammals, poultry and fish.

* * * * *

UNITED STATES PATENT AND TRADEMARK OFFICE
CERTIFICATE OF CORRECTION

PATENT NO. : 7,575,771 B2  Page 1 of 1
APPLICATION NO. : 10/485697
DATED : August 18, 2009
INVENTOR(S) : Ciantar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1290 days.

Signed and Sealed this

Seventh Day of September, 2010

David J. Kappos
*Director of the United States Patent and Trademark Office*